United States Patent [19]
Guillemet

[11] Patent Number: 5,482,396
[45] Date of Patent: Jan. 9, 1996

[54] FRAME MOLDING CONNECTOR

[76] Inventor: Guy Guillemet, 1441 Daunais Street, Terrebonne, Quebec, Canada, J6W 3Y1

[21] Appl. No.: 155,836
[22] Filed: Nov. 23, 1993
[51] Int. Cl.⁶ .................................................. F16B 2/00
[52] U.S. Cl. ........................ 403/401; 403/381; 403/402; 52/658
[58] Field of Search ............................ 403/401, 402, 403/339, 403, 381, 382, 331, 231; 40/155; 52/658, 656.1

[56] References Cited

U.S. PATENT DOCUMENTS

| 94,947 | 6/1905 | Bentley . | |
|---|---|---|---|
| 1,167,155 | 1/1916 | Deroy | 403/381 X |
| 4,099,887 | 7/1978 | Mackenroth | 403/381 X |
| 4,493,583 | 1/1985 | Wallace | 403/402 |
| 4,913,579 | 4/1990 | Campana | 403/401 X |
| 5,090,835 | 2/1992 | Cox | 403/401 X |

FOREIGN PATENT DOCUMENTS

| 2421877 | 11/1975 | Germany | 403/402 |
|---|---|---|---|
| 2719434 | 11/1978 | Germany | 403/402 |
| 540956 | 11/1941 | United Kingdom | 403/401 |
| 8707339 | 12/1987 | WIPO | 403/381 |

Primary Examiner—Eric K. Nicholson
Assistant Examiner—Harry C. Kim

[57] ABSTRACT

A molding connector is described for interconnecting molding ends together to form a frame. The molding connector comprises a male and a female connector formed respectively in a beveled molding end of two moldings to be interconnected. The male connector has a connecting rib formed in the molded end provided with a securing head having an angulated guide edge. The female connector has a rib engaging slot disposed in the beveled molding end with the slot having an enlarged securing cavity for receiving the securing head of the connecting rib in guiding engagement. The connecting rib is positionable into the slot with the head received in the securing cavity, and the angulated edge as well as the securing cavity permitting the beveled ends of the two moldings to be progressively aligned with one another, as the rib is pushed into the slot. The rib and cavity provide a clamping force to interconnect the beveled ends in facial abutting relationship. A flange is also formed in an exterior surface of one of the mated moldings to overlap a joint formed between the interconnected bevel ends and provides an offset joint having a back wall.

9 Claims, 4 Drawing Sheets

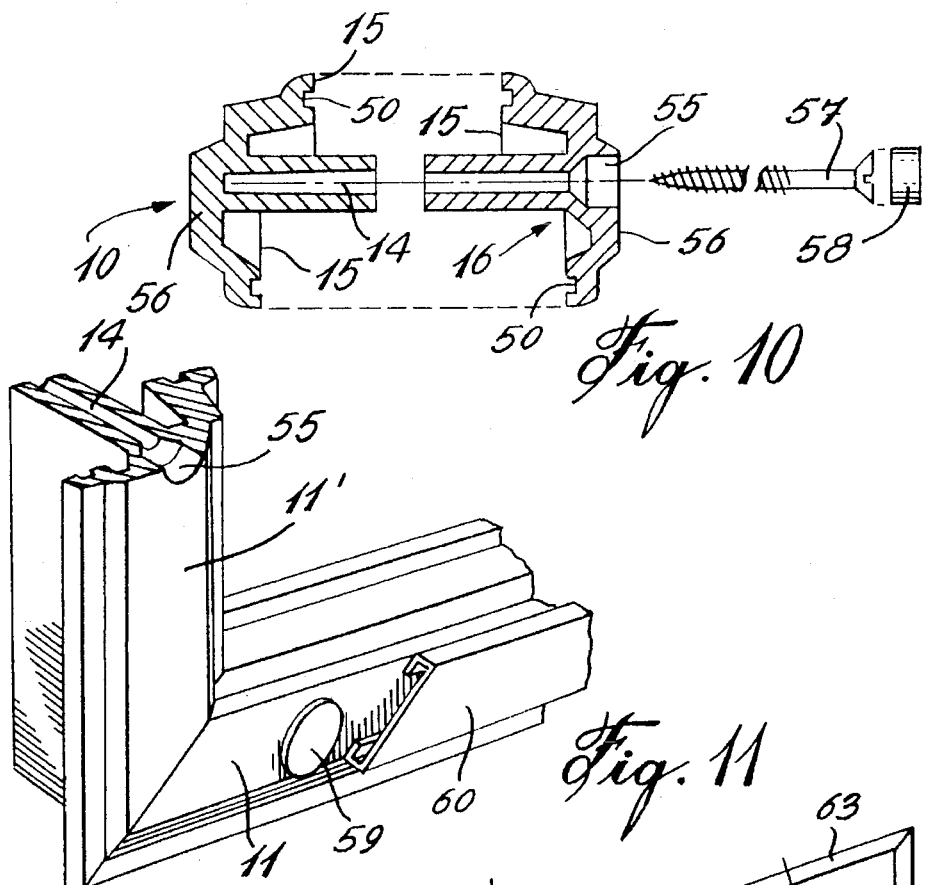
Fig. 10
Fig. 11
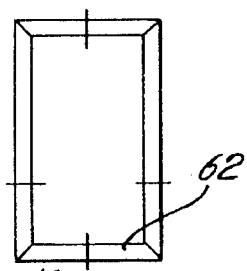
Fig. 12A
Fig. 12B
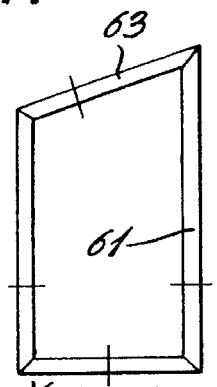
Fig. 12C
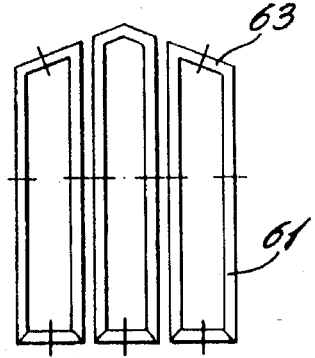
Fig. 12D
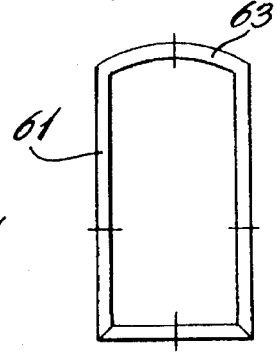
Fig. 12E
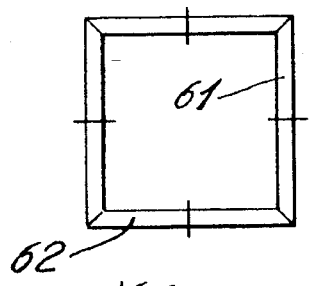
Fig. 12F

FRAME MOLDING CONNECTOR

TECHNICAL FIELD

The present invention relates to a molding connector for interconnecting beveled molding ends together, wherein the connector provides for progressive alignment and clamping connection of the beveled ends for improved fit, and wherein the joints of the interconnected beveled ends of the moldings are concealed to provide an exterior molding finish of superior qualify.

BACKGROUND ART

Known molding connectors for the construction of frames for supporting glass panes or other objects are known. The majority of known frames are molded as a single part and are usually constructed of plastics material. These frames are either injection molded using polystyrene or ABS material. On the other hand, it is known to construct frames by assembling frame parts by the use of mechanical connectors. A disadvantage of the frames constructed of styrene or ABS material is that their joints are imperfect, and the plastic discolors when exposed to sunlight for a prolonged period of time, such as six to twelve months. They must, therefore, be painted in order to hide the discoloration. Frames formed of extruded polyvinyl chloride (PVC) material must be cut, glued and fastened together. The assembly of such frames is labor-intensive and not very reliable. Such frames are usually constructed for supporting glass panes, and these often crack or break during transportation and handling due to fragile parts of the molded profiles.

It is pointed out that injection molded frames are fabricated in molds, and these molds are constructed specifically for a particular size and profile. It is well known that injection molds are extremely costly and that a mold must be made for the exterior moldings as well as the interior moldings of the frame. On the other hand, it is possible to fabricate a mold with inserts for the exterior frame, and once all the parts have been injection molded, the inserts are changed to produce the interior part of a frame. When the product is molded, as above described, it is necessary to manufacture large inventories of parts before the inserts are changed again. This is very costly in labour and inventory.

SUMMARY OF INVENTION

It is therefore a feature of the present invention to provide a molding connector for interconnecting molding ends together to form a frame, and which substantially overcomes the above mentioned disadvantages of the prior art.

Another feature of the present invention is to provide a molding connector capable of use in the fabrication of a frame, either for mounting a window pane, or for other framing use, and wherein the frame is modular and may be assembled to form frames of various sizes and shapes from standard parts depending on the shape, length and configuration of moldings utilized.

Another feature of the present invention is to provide a molding connector for interconnecting beveled molding ends together to form a frame, and wherein the connector utilizes a male and female connector, and wherein a securing head having an angulated guide means is received within a guide cavity of an engaging slot so that the opposed beveled molding ends are brought progressively together in facial contact, and retained in clamping fit by the rib and cavity.

Another feature of the present invention is to provide a molding connector wherein beveled molding ends are interconnected together in clamping fit with the joint of the beveled molding ends being concealed by a concealing means formed in the exterior surface of the connected moldings adjacent the joint area.

According to the above features, from a broad aspect, the present invention provides a molding connector for interconnecting molding ends together to form a frame. The molding connector comprises a male and a female connector formed respectively in a beveled molding end of two moldings to be interconnected. The male connector has a connecting rib formed in the beveled molding end. Thn rib extends transversely to a longitudinal axis of one of the moldings and has a securing head. The securing head has angulated guide means. The female connector has a rib engaging slot disposed in the beveled molding end extending transverse to the longitudinal axis of the other of the moldings. The slot has an enlarged guide cavity in an end thereof for receiving the securing head of the connecting rib in guiding engagement therein. The slot extends from a rear portion of the other molding. The connecting rib is positionable into the slot with the head received in the guide cavity. The angulated guide means and guide cavity permit the beveled ends of the two moldings to progressively align with one another as the rib is pushed into the slot, and provides a clamping force to interconnect the beveled ends in facial abutting relationship.

BRIEF DESCRIPTION OF DRAWINGS

A preferred embodiment of the present invention will now be described with reference to the accompanying drawings in which:

FIG. 9 is a perspective exploded view showing an exterior and an interior frame constructed in accordance with the present invention in position for assembly with one anther;

FIG. 10 is a cross-section view showing an embodiment of interconnecting the inner and outer frames together; and covering the screws with a plug.

FIG. 11 is a fragmented perspective view showing another means of covering the frame retaining screws; and FIGS. 12A to 12F illustrate examples of different frame configurations assembled using the molding connector of the present invention.

DESCRIPTION OF PREFERRED EMBODIMENTS

Figure 1:
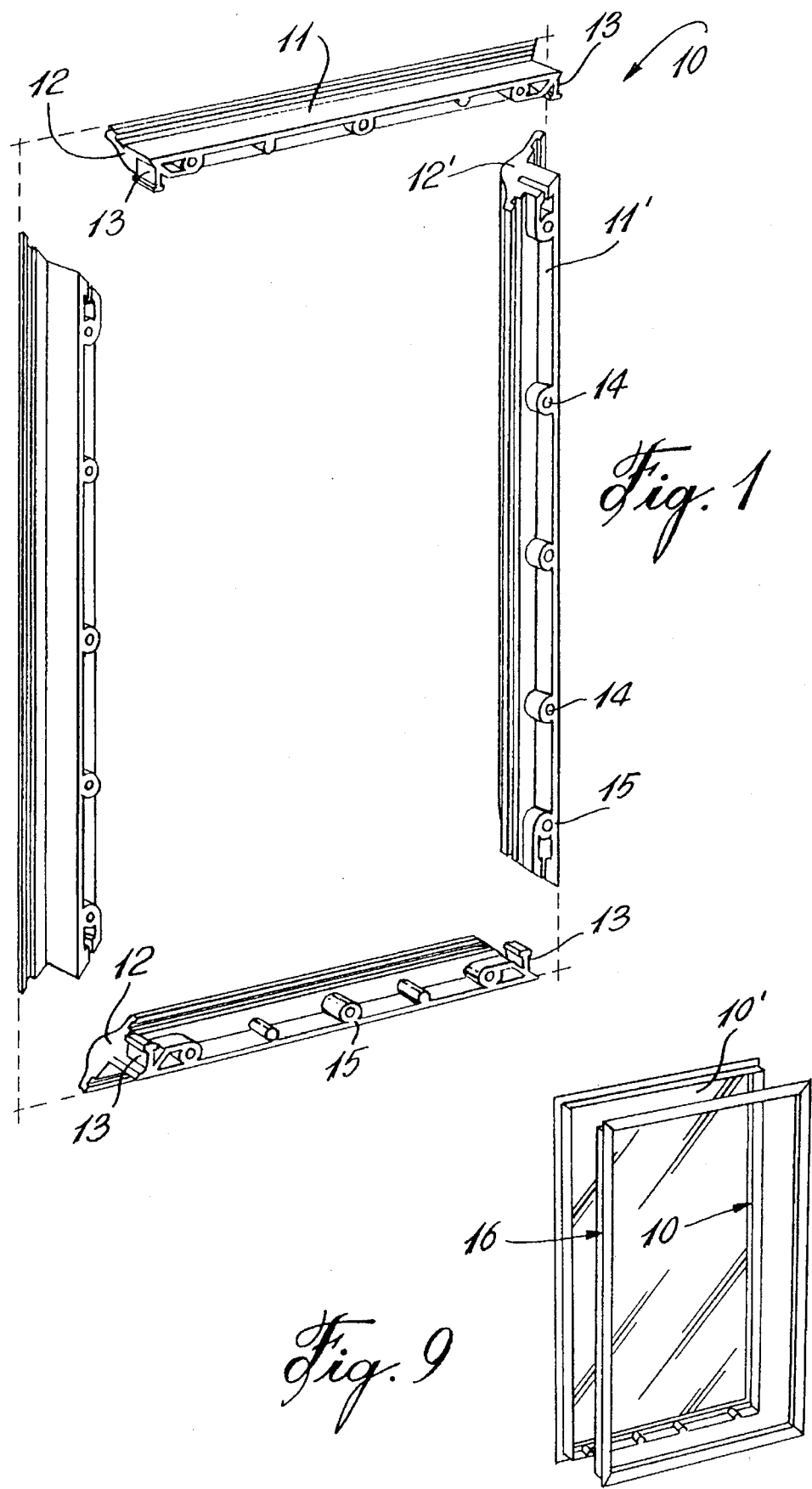
FIG. 1 is a perspective view showing four straight moldings incorporating the molding connector of the present invention at their beveled molding ends for interconnection together, the frame herein being shown in an exploded view.

Referring to the drawings, and more particularly to FIGS. 1 and 9, there is shown generally at 10 the construction of a rectangular frame by interconnecting straight moldings 11 and 11' together at their beveled ends 12 and 12'. As herein shown, some of the beveled ends 12 are provided with male connectors 13 and other moldings, such as the molding 11' provided with female connectors 13' at their beveled ends 12'. The moldings are also provided with fastener bores 14 in a rear face 15 thereof for securing an inner molding frame 16, as shown in FIG. 9, to the exterior frame 10.

More specifically, the present invention is concerned with the molding connector which is formed by the male and female connectors 13 and 13' respectively, which will now be described in detail with reference to FIGS. 2 to 8. More specifically referring to FIG. 2, there is shown the construction of the male connector 13. The male connector consists of a rib 16 which extends transversely to the longitudinal axis of the molding 11 and, as herein shown, is substantially of T-shaped cross-section. As seen from the side the rib is substantially rectangular and defines a web portion 17 having a securing head 18. The head 18 is of rectangular cross-section which extends at the free end of the web, and defines shoulders 19 extending on opposed sides of the web 17. The shoulders have a lower edge 20 which is sloped from the front end 21 of the rib 16, thus making the rib progressively larger from its front end 21 to its rear end 22. Accordingly, the securing head is wedge shaped, as better seen in FIG. 3. The beveled molding end 12 also extends at an angle of 45 degrees to the web portion 17 and to the longitudinal axis of the molding 11.

Figure 4:
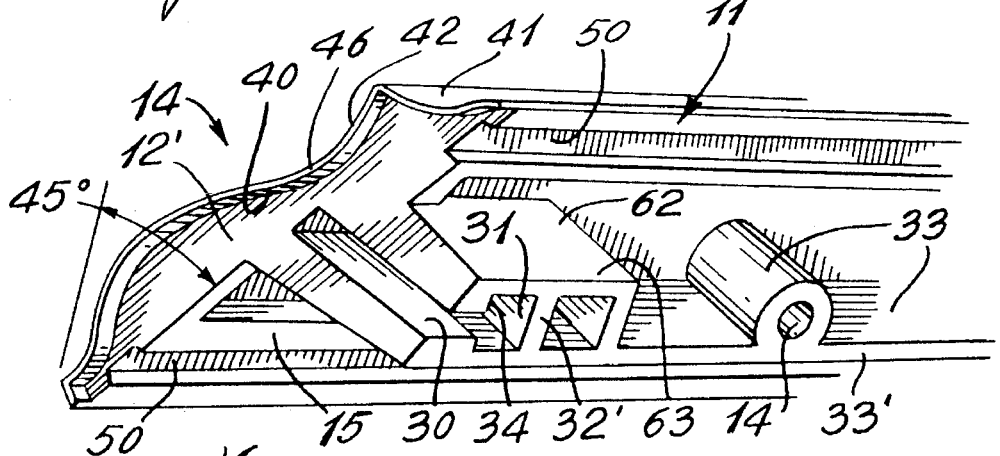
FIG. 4 is an enlarged perspective view showing a beveled molding end having a female connector.

Referring now to FIG. 4, there will be described the construction of the female connector 18'. The female connector comprises a rib receiving slot 30 disposed in the beveled molding end 12' with the slot extending transverse to the longitudinal axis of the molding 11' and forms an opening in the beveled molding end 12'. An enlarged securing cavity 31 is formed in an end of the slot 30 for receiving the securing head 18 of the connecting rib in guiding engagement therewith. The slot extends from a rear wall 32' of a reinforcing rib 32 molded with the molding 11'. At least the front wall 34 of the enlarged guide cavity 31 is sloped from the rear wall 32' to an inner end wall whereby when the connecting rib is positioned into the slot with the head 18 received in the guide cavity 31 the angulated front wall 34, and at least one of the sloped lower edge 20 of the head 22, will engage in sliding fit to draw the beveled ends 12 and 12' of adjacent moldings 11 and 11' progressively closer to one another as the rib is pushed into the slot. The head 22 and the securing cavity 31 are dimensioned and positioned to provide a clamping force to the beveled ends when abutting one another to retain these beveled ends in facial abutting clamped relationship. The dimension of the web and the position of the sloped lower edge are dimensioned for close friction fit with at least the front wall 34 of the guide cavity to provide the clamping force between the beveled molding ends 12 and 12'.

Figure 6:
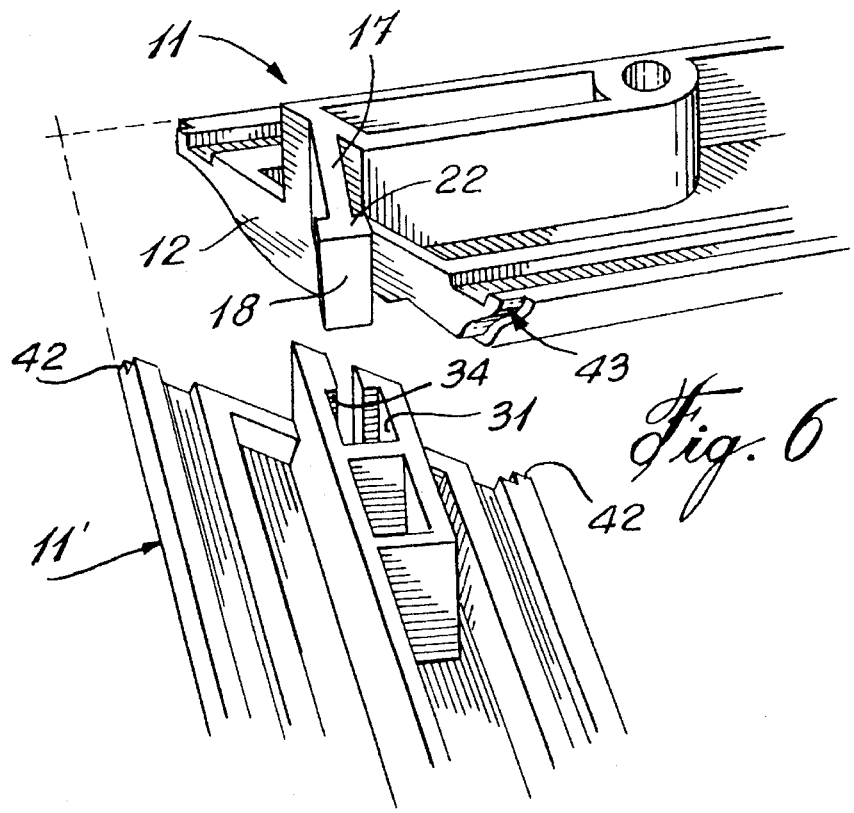
FIG. 6 is an enlarged view showing the male and female connector being positioned for interconnecting two moldings together.
Figure 7:
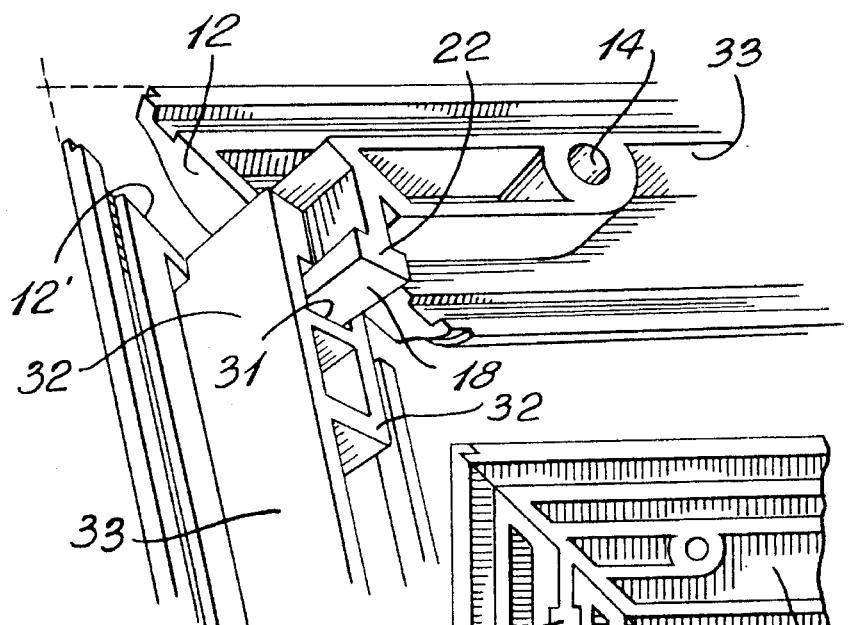
FIG. 7 is a view similar to FIG. 8, but showing the connectors in the process of being interconnected.
Figure 8:
FIG. 8 is a rear view showing two beveled molding ends interconnected together by the connector of the present invention.

As shown in FIGS. 6 to 8, the moldings 11 and 11' are assembled by aligning the securing head 18 of the male connector with the enlarged securing cavity 31. The rib 16 is then pushed into the slot 30, as shown in FIG. 7, until the rear end 22 of the securing head 18 is flush with the rear wall 32' of the reinforcing rib 32. In order to provide a good frictional retention fit, the rib and cavity may be dimensioned such that a solid connection is achieved by tapping the rear end 22 of the post with a hammer to bring it flush with the rear wall 32'. This places the joint in clamped tension with the opposed mated beveled molding ends 12 and 12' in facial contact.

Figure 2:
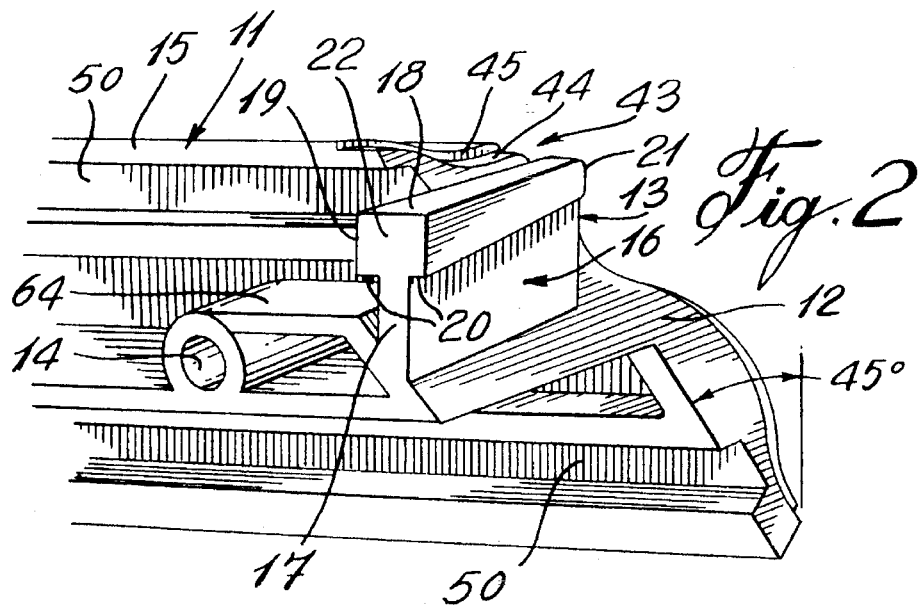
FIG. 2 is an enlarged perspective end view showing the construction of a beveled molding end having a male connector.
Figure 3:
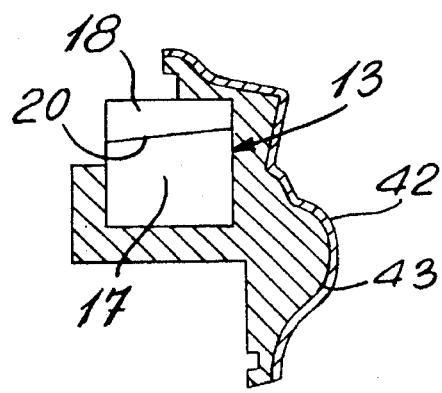
FIG. 3 is an end view of FIG. 2.
Figure 5:
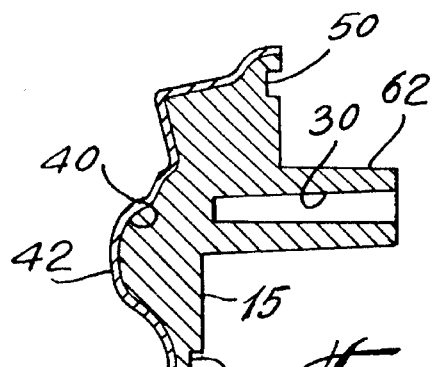
FIG. 5 is an end view of FIG. 4.

Another feature of the present invention is to provide a means to conceal the joint formed by the interconnected beveled molding ends. This concealing means is herein provided by a flange extension 40 formed, herein molded, in an exterior surface 41 of one of the two moldings 11 or 11', herein the molding 11' having the female connector. This flange extension 40 overlaps the beveled molding end 12' uniformly throughout the exterior surface. As herein shown, the exterior surface also has a curved profile 42 as an example only, as many shapes and forms are envisaged. The other molding 11, as shown in FIG. 2 and having the male connector 13, is provided with a recessed edge portion 43 in the exterior surface 41 and adjacent the beveled molding end 12. The recessed portion is of uniform width to receive the flange extension portion 40 therein. This forms an offset joint which is provided with a back wall formed by the flat rear surface 44 of the recessed edge portion 43 thereby preventing see-through joints. Also, any slit provided by this offset joint is easily filled with a compound, as the slot is very shallow and the compound can set on the facial rear wall 44 and between the recessed edge side wall 45 and the edge wall 46 of the flange extension 40. Thus, a quality water resistant joint can be produced.

In the preferred embodiment as herein shown, the enlarged securing cavity 31 is of rectangular cross-section and has a tapered flute configuration for receiving the tapered rib in close sliding fit therein. It is also conceivable that the cavity may be an L-shaped cavity having a single front wall 34 to receive a rib, which is also L-shaped having a single sloped lower edge 20 to engage the front wall 34 of the cavity.

As is also shown in FIGS. 2 to 8, the moldings 11 and 11' are provided with one or more elongated channels 50 in the rear face 15 thereof for receiving a sealing compound (not shown) therealong for sealing engagement with a face of a flat wall (not shown) having an opening therein and with a window pane 10' supported between interconnected exterior and interior moldings, as shown in FIG. 9.

With reference now to FIGS. 10 and 11, there is shown alternate embodiments of how the exterior and interior frames 10 and 16 may be interconnected together. As shown in FIG. 10, the exterior and interior frames are of like cross-section, and therefore can be formed with a single mold. However, to fasten these frames together, it is necessary to drill a cavity 55 in alignment with the fastener connecting bores 14. Such cavities can be drilled on jigs in the exterior wall 56 of the interior molding 16. A screw fastener 57 is inserted within the cavity 55 which is countersunk, and the head of the fastener 57 is then concealed by a plug 58. FIG. 11 shows another embodiment wherein the plug may be provided with a connecting head 59 which permits the holes 55 and head 59 to be concealed by sliding an extruded U-shaped concealment strip 60 over the heads. Accordingly, the interior frame would display a completely finished product free of fastener heads or plugs.

FIGS. 12A and 12F illustrate various frame configurations that are capable of being achieved with the present invention. For example, as shown in FIGS. 12A to 12E, the side frames 61 are all of standard lengths and may therefore all be made from the same molds. Similarly, the end frames 62, as shown in FIGS. 12A and 12F, are of the same size. Therefore, if the frame is to have a bow shape, or any other angulated shape, this can be achieved by simply modifying one of the frame members, such as frame members 63. It can thus be appreciated that considerable cost saving is achieved in the mold construction, and that a great variety of frame sizes and shapes may be achieved with fewer molded parts. These moldings are also injection molded of polystyrene, such as high impact polystyrene or PVC. The frames may also be utilized as window openings in doors, and in such instance the glass pane 10' would be mounted between the abutting rear faces 15 of opposed exterior and interior moldings 10 and 16 respectively, as shown in FIG. 9. The lower rear faces 15 would be secured adjacent the door wall with sealant provided within the channels 50. The window pane 10' would be in support engagement with the top walls 62 of the ribs 32, as shown in FIG. 4.

It is within the ambit of the present invention to cover any obvious modifications of the preferred embodiment described herein, provided such modifications fall within the scope of the appended claims.

I claim:

1. A molding connection assembly for forming a frame comprising a plurality of moldings, each molding having a longitudinal axis and opposed beveled molding ends for interconnecting with beveled molding ends of adjacent moldings, the assembly further comprising male and female connectors, wherein said male connector being monolithically formed on the beveled molding end of one of said moldings, said male connector having a connecting rib and a securing head, said connecting rib extending transversely to said longitudinal axis of said one molding and said securing head having angulated guide means, said female connector being monolithically formed on a beveled molding end of another of said moldings, said female connector having a rib engaging slot disposed in said beveled molding end thereof, said rib engaging slot extending transverse to said longitudinal axis of said other molding, said rib engaging slot having an enlarged securing cavity in an end thereof for receiving said securing head of the male connector in guiding engagement therein, said rib engaging slot extending from a rear portion of said other molding, said connecting rib being positionable into said rib engaging slot with said securing head received in said securing cavity, said angulated guide means comprising a sloped lower edge of said securing head, said securing cavity having a sloped guide wall adjacent said rib engaging slot for guiding engagement with said sloped edge of said securing head thereby permitting said beveled ends of said two moldings to progressively align with one another as said connecting rib is pushed into said rib engaging slot and to provide a clamping force to interconnect said beveled molding ends in facial abutting relationship.

2. The assembly as claimed in claim 1 wherein there is further provided conceal means to overlap a joint formed between said interconnected beveled molding ends of said two moldings.

3. The assembly as claimed in claim 2 wherein said conceal means comprises a flange extension formed in an exterior surface of said one of said two moldings and overlapping said beveled molding end, and a recess edge portion in an exterior surface of said other of said two moldings adjacent said beveled molding for receiving said flange extension in close fit therein.

4. The assembly as claimed in claim 3 wherein said beveled molding ends of said two moldings are sloped at a 45 degree angle with respect to said longitudinal axes, said connecting rib having a support web section extending at right angle to said exterior surface of said one of said two moldings, said beveled molding end extending at a sloping angle of 45 degrees from said support web, said securing head extending along a top edge of said web a predetermined distance from said beveled molding end.

5. The assembly as claimed in claim 2 wherein said moldings are provided with one or more elongated channels in a rear face thereof for receiving a sealing compound therein.

6. The assembly as claimed in claim 2 wherein said moldings are provided with fastener receiving cavities in a rear face thereof for securing an inner molding frame to an outer molding frame formed in the interconnected moldings.

7. The assembly as claimed in claim 2 wherein said molding exterior surface is a molded profiled surface, said molding being interconnected to form said frame for retaining a glass pane in a window cavity of a door.

8. The assembly as claimed in claim 1 wherein said connecting rib is a rectangular rib of T-shape cross-section, said securing head being a tapered head of rectangular cross-section and formed at a free end of said web and defining shoulders to each side of said web, said sloped lower edge being formed in a transverse lower edge of said shoulders.

9. The assembly as claimed in claim 8 wherein said securing cavity is a tapered cavity of rectangular cross-section, said cavity and said head being dimensioned for close friction retention fit when said head is fully inserted into said cavity.

\* \* \* \* \*